(12) United States Patent
Luo et al.

(10) Patent No.: US 12,169,668 B2
(45) Date of Patent: Dec. 17, 2024

(54) METHOD FOR PARAMETERS OF CROSS SECTIONS OF SINGLE-HOLE FOUR-LANE HIGHWAY TUNNEL

(71) Applicant: CHANG'AN UNIVERSITY, Shaanxi (CN)

(72) Inventors: Yanbin Luo, Shaanxi (CN); Jianxun Chen, Shaanxi (CN); Fangfang Dong, Shaanxi (CN); Chuanwu Wang, Shaanxi (CN); Daochuan Zhong, Shaanxi (CN); Chaopeng Tian, Shaanxi (CN)

(73) Assignee: CHANG'AN UNIVERSITY, Xi'an Shaanxi (CN)

( * ) Notice: Subject to any disclaimer, the term of this patent is extended or adjusted under 35 U.S.C. 154(b) by 456 days.

(21) Appl. No.: 17/657,467

(22) Filed: Mar. 31, 2022

(65) Prior Publication Data

US 2022/0292238 A1  Sep. 15, 2022

Related U.S. Application Data

(63) Continuation of application No. PCT/CN2021/087855, filed on Apr. 16, 2021.

(30) Foreign Application Priority Data

Apr. 21, 2020 (CN) .......................... 202010315996.0

(51) Int. Cl.
*G06F 30/23* (2020.01)
*G06F 30/13* (2020.01)
(Continued)

(52) U.S. Cl.
CPC .............. *G06F 30/23* (2020.01); *G06F 30/13* (2020.01); *G05B 2219/23006* (2013.01); *G06F 2111/10* (2020.01); *G06F 2119/14* (2020.01)

(58) Field of Classification Search
CPC ...... G06F 30/23; G06F 30/13; G06F 2111/10; G06F 2119/14; G05B 2219/23006; E21D 9/14; E21D 11/00
See application file for complete search history.

(56) References Cited

U.S. PATENT DOCUMENTS

| 2009/0183321 A1 | 7/2009 | Boresi et al. |
| 2019/0071968 A1 | 3/2019 | Chen et al. |

FOREIGN PATENT DOCUMENTS

| CN | 105320817 A | 2/2016 |
| CN | 108894799 A | 11/2018 |

(Continued)

OTHER PUBLICATIONS

Guo, Wenming, "Study on span-Ratio and Construction Method Optimization of Road Tunnel with Super-large Cross-Section", Chinese Master's Theses Full-Text Database, Engineering Science & Technology II , vol. 07, Jul. 15, 2013, ISSN: 1674-0246, No. 1, 2, 3 and 4, pp. 8-41.

(Continued)

*Primary Examiner* — Stacy Whitmore
(74) *Attorney, Agent, or Firm* — NKL Law; Allen Xue

(57) ABSTRACT

A method for determining parameters of cross sections of a single-hole four-lane highway tunnel includes the steps of determining surrounding rock pressure, constructing numerical models under different flatness ratios, calculating interval force of lining structures, calculating safety coefficients of the lining structures, performing contrastive analysis on the cross sections under different flatness ratios, obtaining reasonable cross section forms, and so on. This method provides a basis to formulate the specifications and standards for design of a single-hole four-lane highway tunnel and may provide a reference basis to design a cross section of a single-hole four-lane highway tunnel in new construction or reconstruction and expansion, thereby ensuring safety and economic efficiency of the cross section forms of the single-hole four-lane highway tunnel.

3 Claims, 8 Drawing Sheets

(51) Int. Cl.
*G06F 111/10* (2020.01)
*G06F 119/14* (2020.01)

(56) References Cited

FOREIGN PATENT DOCUMENTS

| CN | 109667598 A | 4/2019 |
|---|---|---|
| CN | 111488707 A | 8/2020 |

OTHER PUBLICATIONS

Guo, Wenming, "Research in Optimization on Super-Large Sections and Super-Span Highway Tunnel"(non-official translation), Conference Proceedings on 2013 International Highway Technology Summit, Nov. 12, 2013, No. 1, 2, 3 and4, pp. 955-963.

Qu, Haifeng; "An Overview on Construction and Research of Super-large Cross-section Tunnels with Low Height- span Ratios"; Tunnel Construction; vol. 29, No. 2; Apr. 20, 2009; pp. 166-171.

Wu, Mingxian et al.; "(Google Translation)Single-hole Four-lane Extra-large Cross-section Highway Tunnel Key Technologies in Design and Construction"; Highway; No. 10; Oct. 25, 2009; pp. 317-323.

Zhang, Bingqiang et al.; "(Google translation)Optimization Study of Single-hole Four-lane Highway Tunnel"; East China Highway; No. 4(Total No. 166); Aug. 20, 2007; pp. 1-4.

Zeng, Hongfei et al.; "(Google translation)On-site Monitoring and Analysis Research on Single-hole Four-lane Highway Tunnel"; Railway Engineering; vol. 4; Apr. 20, 2015; pp. 85-88.

Zhong, En; "(Google translation)Design and Construction of Single-hole Four-lane Extra-large Cross-section Highway Tunnel Key Technical Analysis"; Transpoworld; No. 4/5/6(Total No. 418/419/420); Feb. 2017; pp. 1-2.

Ding, Hao; "Statistical Analysis for Key Indicators of Contour in Single-hole and 4-lane Tunnels and Enlightenment"; Technology of Highway and Transport; No. 6; Dec. 25, 2012; pp. 89-91.

METHOD FOR PARAMETERS OF CROSS SECTIONS OF SINGLE-HOLE FOUR-LANE HIGHWAY TUNNEL

FIELD

The present disclosure belongs to the field of highway engineering and tunnel engineering technologies, and particularly relates to a design method for parameters of cross sections of a single-hole four-lane highway tunnel.

BACKGROUND

High-speed development of national economy significantly increases a traffic volume of an expressway. A bidirectional four-lane or six-lane expressway cannot meet the requirement of transportation. Therefore, a bidirectional eight-lane expressway is imperative. In projects of new construction or reconstruction and expansion of bidirectional eight-lane expressways, a large number of double-hole eight-lane (i.e., single-hole four-lane) highway tunnels emerge. A single-hole four-lane highway tunnel refers to a highway tunnel that has four traffic lanes in a single hole. Different from a single-hole two-lane and three-lane highway tunnel, the single-hole four-lane highway tunnel is higher in excavation span, higher in excavation height and flatter in tunnel cross section. This not only increases project cost, but also raises a higher requirement on safety of a supporting structure.

Currently, construction of single-hole four-lane highway tunnels in China is at an initial stage, there is little related engineering experience, and only cross section forms and parameters of a single-hole two-lane highway tunnel and a single-hole three-lane highway tunnel rather than a single-hole four-lane highway tunnel are given in the current *Specifications for Design of Highway Tunnels*. As highway traffic develops in China, the demand of construction of single-hole four-lane highway tunnels continuously grows. Therefore, a design method that is for parameters of cross sections of a single-hole four-lane highway tunnel and that can meet tunnel use functions, ensure structural safety and also meet engineering economic efficiency requirements needs to be proposed urgently.

SUMMARY

For the foregoing problems, the present disclosure provides a design method for parameters of cross sections of a single-hole four-lane highway tunnel.

The present disclosure is implemented through the following technical solutions.

Provided is a design method for parameters of cross sections of a single-hole four-lane highway tunnel. The design method is used to design cross section forms and parameters of cross sections of the single-hole four-lane highway tunnel. The design method may determine the cross section forms and the parameters that are of the single-hole four-lane highway tunnel and that meet the *Specifications for Design of Highway Tunnels* (JTG 3370.1—2018) and also meet requirements on safety and economic efficiency.

The design method for parameters of cross sections of a single-hole four-lane highway tunnel includes the following steps:

(1) determining surrounding rock pressure:
assuming that lining structures of the tunnel mainly bear a loose load from surrounding rock, and in a case that tectonic stress is not considered, a lateral pressure coefficient $\lambda$, ($\lambda = \sigma_{horizontal}/\sigma_{vertical}$) is less than 1, constructing a load-structure model, wherein G represents gravity of the structures; and according to the *Specifications for Design of Highway Tunnels* (JTG 3370.1—2018), determining a surrounding rock class based on surrounding rock conditions, and calculating the surrounding rock pressure of the single-hole four-lane highway tunnel, wherein the surrounding rock pressure includes vertical uniform pressure q and horizontal uniform pressure e, and the horizontal uniform pressure e is obtained after the obtained vertical uniform pressure is multiplied by the lateral pressure coefficient $\lambda$ given in the *Specifications for Design of Highway Tunnels*;

(2) constructing numerical models under different flatness ratios:

provided that flatness ratios of cross sections of a single-hole four-lane highway tunnel with an inverted arch are distributed in a range of 0.500 to 0.750 and flatness ratios of cross sections of a single-hole four-lane highway tunnel without an inverted arch are distributed in a range of 0.400 to 0.560, when a cross section with an inverted arch is designed, respectively selecting multiple groups of different flatness ratios from 0.500 to 0.750, when a cross section without an inverted arch is designed, respectively selecting multiple groups of different flatness ratios from 0.400 to 0.560, so as to meet a same construction limit, and respectively constructing tunnel numerical calculation models by using MIDAS/GTS finite element software;

(3) calculating internal force of the lining structures:
calculating the stress of lining structures of the cross sections under different flatness ratios through a load-structure method by using the MIDAS/GTS finite element software, and arranging calculation results of axial force N and bending moments M of the lining structures;

(4) calculating safety coefficients of the lining structures:
based on the calculation results of axial force N and bending moments M of linings at different positions of the cross sections meanwhile considering the mechanical parameters of lining materials, the safety coefficients K of the lining structures at different positions of the cross sections are calculated;

(5) comparison between different flatness ratios: respectively performing contrastive analysis of safety and economic efficiency on cross section forms under different flatness ratios;

(5.1) comparison on safety coefficients: counting internal force and safety coefficients of the lining structures at the most disadvantageous positions under different flatness ratios, counting minimum safety coefficients under different flatness ratios, drawing a curve that illustrates a relationship between the flatness ratios and the minimum safety coefficients that fluctuate along with the increase of flatness ratios of the cross sections, for a cross section with an inverted arch, taking a flatness ratio interval with the minimum safety coefficient greater than 4.50 as an optimal safety interval, and for a cross section without an inverted arch, taking a flatness ratio interval with the minimum safety coefficient greater than 3.20 as an optimal safety interval;

(5.2) performing analysis on economic efficiency: counting economic efficiency indexes such as cross section perimeters, cross section areas and cross section utilization ratios under different flatness ratios, calculating cross section utilization ratios under different flatness ratios, drawing a curve that illustrates a relationship between the flatness ratios and the cross section utilization ratios that fluctuate along with the increase of flatness ratios of the cross sections, for a cross section with an inverted arch, taking a flatness ratio interval with a cross section utilization ratio greater than 50% as an optimal economic efficiency interval, and for a cross section without an inverted arch, taking a flatness ratio interval with a cross section utilization ratio greater than 60% as an optimal economic efficiency interval; and (6) obtaining reasonable cross section forms:

summarizing analysis results of safety and economic efficiency of the lining structures of the tunnel, and taking an overlapping range of a safety analysis optimal flatness ratio interval and an economic efficiency analysis optimal flatness ratio interval as a flatness ratio optimal interval, wherein an optimal flatness ratio position is in an optimal cross section form of the single-hole four-lane highway tunnel.

For the design method for parameters of cross sections of a single-hole four-lane highway tunnel, in step (4), for a pre-designed lining reinforced concrete component, a depth x of compression zone of each cross section may be calculated first according to Formula (1), in a direction perpendicular to the cross sections, and based on a tension and compression balance:

$$R_g(A_g - A'_g) = R_w b x \quad (1)$$

When the depth x of compression zone of the cross sections of the tunnel is less than or equal to $0.55h_0$, the secondary lining is a belonging to large eccentricity condition, a breakage form of the component is tensile breakage, a bearing capacity of a normal cross section is controlled by a tensile rebar, safety coefficient of each cross section is calculated according to the formula below based on a static equilibrium theorem and a moment balance of two sides of the component (FIG. 3), and the least value of the formula is taken as the safety coefficient of the cross section:

$$K_1 \leq \frac{R_w b x + R_g (A'_g - A_g)}{N} \quad (2)$$

$$K_2 \leq \frac{R_w b x (h_0 - x/2) + R_g A'_g (h_0 - a')}{Ne} \quad (3)$$

$$K = \min(K_1, K_2). \quad (4)$$

At the moment, the position of neutral axis is determined according to the formula below:

$$R_g(A_g e \mp A'_g e') = R_w b x (e - h_0 + x/2) \quad (5)$$

When the axial force N acts between a gravity center of a rebar $A_g$ and a gravity center of a rebar $A'_g$, a second term on a left side of Formula (5) is positive; when the axial force N acts outside gravity center, the second term takes a negative sign.

When considering a stressed rebar during calculation, a depth of compression zone of concrete should meet the requirement that x is greater than or equal to 2a', so as to ensure that stressed rebars on the cross sections of the component reach a design value of tensile strength when the component is broken, and if the requirement is not met, calculation is performed according to Formula (6):

$$K \leq \frac{R_g A_g (h_0 - a')}{Ne'}. \quad (6)$$

When the depth x of compression zone of the cross sections of the tunnel is greater than $0.55h_0$, a secondary lining is a component with small eccentricity, a breakage form of the component is tensile breakage, a bearing capacity of a normal cross section is controlled by concrete of a compression zone, and the safety coefficient of each cross section is calculated according to Formula (7) (FIG. 4):

$$K \leq \frac{0.5 R_w b h_0^2 + R_g A'_g (h_0 - a')}{Ne}. \quad (7)$$

When the axial force N acts between the gravity center of the rebar $A_g$ and the gravity center of the rebar $A'_g$, the following requirements should be met:

$$K \leq \frac{0.5 R_w b h_0^2 + R_g A_g (h'_0 - a)}{Ne'}. \quad (8)$$

In the formula: N represents axial force (MN); M represents a bending moment (MN·m); $R_g$ represents a standard value of tensile strength or compressive strength of a rebar; $R_w$ represents limit bending compressive strength of concrete, and $R_w = 1.25 R_a$; $A_g$ and $A'_g$ represent cross section areas (m²) of a rebar in a tensile zone and a compressive zone; a' represents a distance (m) from the gravity center of the rebar $A'_g$ to a nearest edge of a cross section; a represents a distance (m) from the gravity center of the rebar $A_g$ to the nearest edge of the cross section; h represents a height of a cross section; $h_0$ represents an effective height (m) of a cross section, and $h_0 = h - a$; x represents a depth (m) of compression zone of concrete; b represents a width (m) of a rectangular cross section; e and e' represent distances (m) from the gravity centers of the rebars $A_g$ and $A'_g$ to an acting point of the axial force; and K represents a safety coefficient.

For the design method for parameters of cross sections of a single-hole four-lane highway tunnel, in step (5), a cross section utilization ratio refers to a ratio of a construction limit area to a clearance area.

The present disclosure has the beneficial technical effects.

The present disclosure provides cross section forms of a single-hole four-lane highway tunnel for different design speeds, which takes into account safety and economic efficiency, and solves the trouble that the current *Specifications for Design of Highway Tunnels* provides no cross section forms of a single-hole four-lane highway tunnel. This may provide a basis to formulate specifications and standards for design of a single-hole four-lane highway tunnel in China and may provide a reference basis to design a cross section of a single-hole four-lane highway tunnel in new construction or reconstruction and expansion in China. In the present disclosure, through numerical simulation and structure internal force calculation under different flatness ratio parameters, a tunnel flatness ratio interval value for safety and economic efficiency is obtained. The cross sections of the tunnel are designed in sequence, and this may ensure the safety and economic efficiency of the cross section forms of the single-hole four-lane highway tunnel.

DETAILED DESCRIPTION OF THE EMBODIMENTS

To make the objectives, technical solutions and advantages of the present disclosure clearer, the following further describes the present disclosure in detail with reference to the accompanying drawings and the embodiments. It should be understood that the specific embodiments described herein are merely used to interpret the present disclosure, but are not intended to limit the present disclosure.

Conversely, the present disclosure covers any replacement, modification, equivalent method and solution that are defined by claims and made on the spirit and scope of the present disclosure. Further, to allow the public to have a better understanding of the present disclosure, some specific details are described in detail in the following detail descriptions of the present disclosure. In the absence of the descriptions of these details, a person skilled in the art may completely understand the present disclosure.

In the design of cross sections of a tunnel, a construction limit that is of a single-hole four-lane highway tunnel and that meets regulations of composition and size of cross sections of a highway tunnel construction limit needs to be designed based on a design vehicle speed requirement according to the *Specifications for Design of Highway Tunnels* (*JTG* 3370.1—2018). On this basis, the design of cross sections of a tunnel is performed. In the design of cross sections, flatness ratio parameters of the tunnel serve as the most core and most important parameters. The flatness ratio refers to a ratio of height to span of the tunnel, and is the basis to determine other parameters of the cross sections.

According to the *Specifications for Design of Highway Tunnels* (*JTG* 3370.1—2018), a clearance cross section of an inner contour of the designed cross sections of the tunnel satisfies a space required for the construction limit of the tunnel, reserves a margin of not less than 50 mm, and satisfies a space required for internal decoration, traffic engineering and ancillary facilities. A shape of the cross sections is conducive to surrounding rock stability and structure stress.

Figure 1:
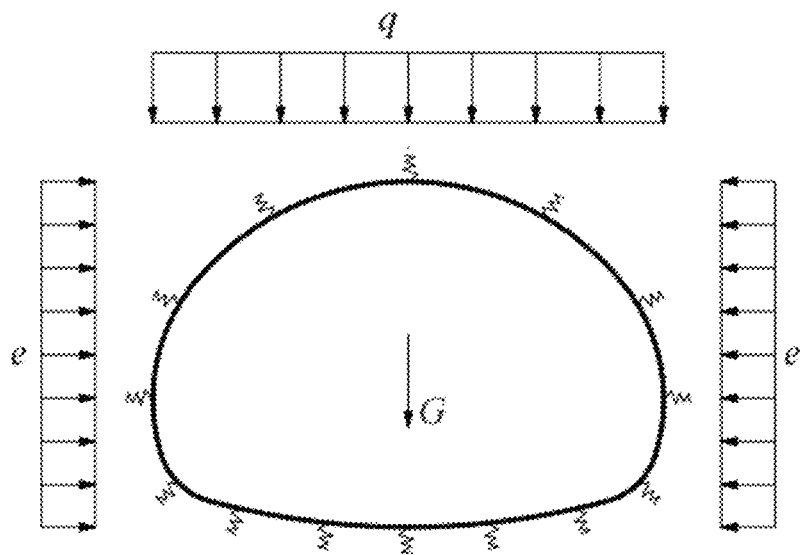
FIG. 1 illustrates load conditions of a cross section model with an inverted arch.
Figure 2:
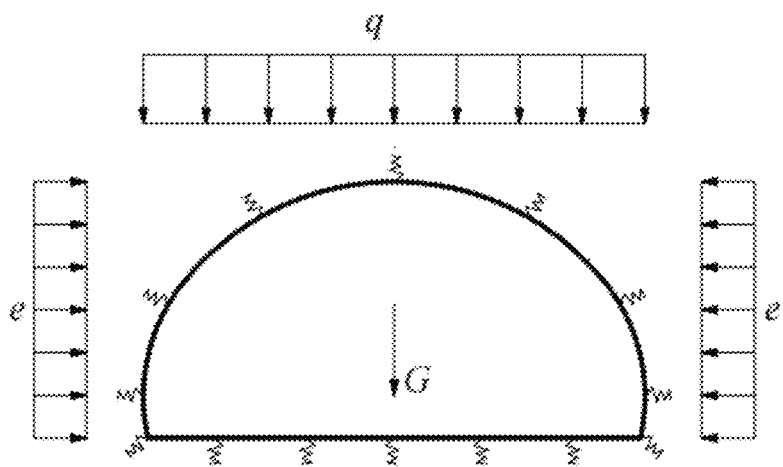
FIG. 2 illustrates load conditions of a cross section model without an inverted arch.

FIG. 1 illustrates load conditions of a cross section model with an inverted arch. FIG. 2 illustrates load conditions of a cross section model without an inverted arch. Assuming that lining structures of the tunnel mainly bear a loose load from surrounding rock, and in a case that tectonic stress is not considered, a lateral pressure coefficient $\lambda$ ($\lambda = \sigma_{horizontal}/\sigma_{vertical}$) is less than 1, a load-structure model is constructed, wherein G represents gravitational force of the structures, q represents a vertical uniform load, and e represents a horizontal load.

Figure 3:
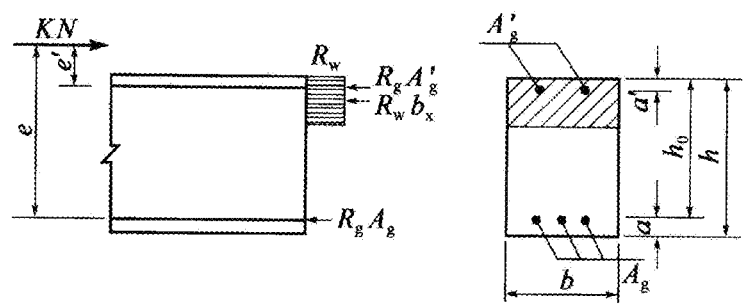
FIG. 3 is a diagram illustrating calculation of safety coefficients when a secondary lining of reinforced concrete is stressed under large eccentricity.
Figure 4:
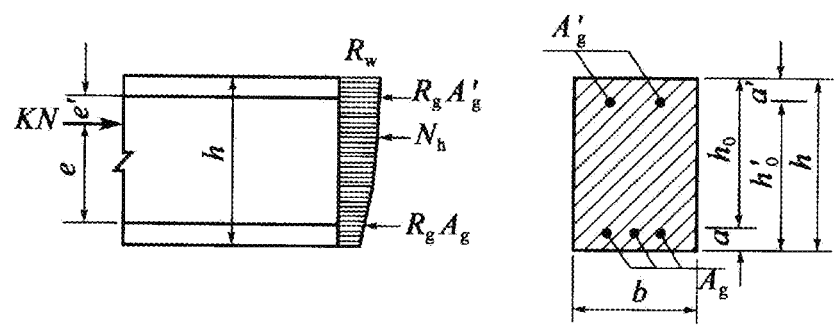
FIG. 4 is a diagram illustrating calculation of safety coefficients when a secondary lining of reinforced concrete is stressed under small eccentricity.

FIG. 3 is a model illustrating calculation of safety coefficients when a secondary lining of reinforced concrete is stressed under large eccentricity. FIG. 4 is a model illustrating calculation of safety coefficients when a secondary lining of reinforced concrete is stressed under small eccentricity. In the figures, all parameters mean that: N represents axial force (MN); M represents a bending moment (MN·m); $R_g$ represents a standard value of tensile strength or compressive strength of a rebar; $R_w$ represents limit bending compressive strength of concrete, and $R_w = 1.25 R_a$; $A_g$ and $A'_g$ represent cross section areas (m²) of a rebar in a tensile zone and a compressive zone; a' represents a distance (m) from the gravity center of the rebar $A'_g$ to a nearest edge of a cross section; a represents a distance (m) from the gravity center of the rebar $A_g$ to the nearest edge of the cross section; h represents a height of a cross section; $h_0$ represents an effective height (m) of a cross section, and $h_0 = h - a$; x represents a depth (m) of compression zone of concrete; b represents a width (m) of a rectangular cross section; e and e' represent distances (m) from the gravity centers of the rebars $A_g$ and $A'_g$ to an acting point of the axial force; and K represents a safety coefficient.

FIG. 3 is a model illustrating calculation of safety coefficients when a secondary lining of reinforced concrete is stressed under large eccentricity. A breakage form of a component is tensile breakage, and a bearing capacity of a normal cross section is controlled by a tensile rebar. KN represents acting force borne by a cross section, $R_g A_g$ represents tensile force capable of being borne by a tensile rebar, $R_w bx$ represents pressure capable of being borne by a compression zone of concrete, and $R_g A'_g$ represents pressure capable of being borne by a stressed rebar. A depth x of compression zone may be obtained based on a static equilibrium of a bearing capacity of the component in a direction perpendicular to a direction of a cross section. Then, a safety coefficient K may be obtained based on a torque balance of the stressed rebar or a static equilibrium of the whole component.

FIG. 4 is a model illustrating calculation of safety coefficients when a secondary lining of reinforced concrete is stressed under small eccentricity. A breakage form of a component is tensile breakage, a bearing capacity of a normal cross section is controlled by concrete of a compression zone, and a total cross section of reinforced concrete is stressed. N represents acting force borne by a cross section, $R_g A_g$ represents tensile force capable of being borne by a tensile rebar, Nh represents pressure capable of being borne by a compression zone of concrete, and $R_g A'_g$ represents pressure capable of being borne by a stressed rebar. A safety coefficient K may be obtained based on a torque balance of the stressed rebar or a rebar of a compression zone or a static equilibrium of the whole component.

Calculation of the structure uses a load-structure method. For the ease of calculation, the following assumes that: (1) because the tunnel is of a long and narrow structure in a longitudinal direction, a planar strain model is used for analysis; (2) a lining, assumed as a small-deformation elastic beam, is segmented into a plurality of uniform-thickness beam units; and (3) interactions between surrounding rock and the structure are simulated by using spring units distributed on all joints of the model, wherein the spring units do not bear tensile force and automatically fall off after being tensioned, and counteracting force of stressed springs is namely elastic resistance of surrounding rock to the lining.

The design method for reasonable cross sections of a single-hole four-lane highway tunnel has the following specific flow:

(1) surrounding rock pressure is determined:
according to the *Specifications for Design of Highway Tunnels (JTG 3370.1—2018)*, a surrounding rock class is determined based on surrounding rock conditions, and the surrounding rock pressure of the single-hole four-lane highway tunnel is calculated, wherein the surrounding rock pressure includes vertical uniform pressure q and horizontal uniform pressure e, the vertical uniform pressure is determined according to a formula of calculating vertical uniform pressure of a loose load of a deep tunnel, i.e., $q=0.45 \times 2^{s-1} \omega \cdot \gamma$, and the horizontal uniform pressure e is obtained after the obtained vertical uniform pressure q is multiplied by a lateral pressure coefficient $\lambda$ given in the *Specifications for Design of Highway Tunnels*;

(2) numerical models under different flatness ratios are constructed:
based on a construction limit stipulated in the *Specifications for Design of Highway Tunnels*, when a cross section with an inverted arch is designed, multiple groups of different flatness ratios from 0.500 to 0.750 are respectively selected, when a cross section without an inverted arch is designed, multiple groups of different flatness ratios from 0.400 to 0.560 are respectively selected, building materials and lining sizes that are to be used for design are determined, parameters of equivalent lining physical materials of the tunnel are determined, and tunnel numerical calculation models are respectively constructed by using MIDAS/GTS finite element software;

(3) internal force of the lining structures is calculated:
stress on the lining structures of the cross sections of the tunnel under different flatness ratios is calculated by using the MIDAS/GTS finite element software through a load-structure method, and calculation results of axial force N and bending moments M of the lining structures are arranged;

(4) safety coefficients of the lining structures are calculated:
based on calculation results of the axial force N and the bending moments M of linings at different positions of the cross sections by using the MIDAS/GTS finite element software in step (3) and physical and mechanical parameters of lining materials, the safety coefficients K of the lining structures at different positions of the cross sections are calculated, and calculation results of the safety coefficients K of the lining structures of the cross sections of the tunnel under different flatness ratios are counted;

for a pre-designed lining reinforced concrete component, a depth x of compression zone of each cross section may be calculated first according to the formula below, in a direction perpendicular to the cross sections, and based on a tension and compression balance:

$$R_g(A_g - A'_g) = R_w bx;$$

when the depth x of compression zone of the cross sections of the tunnel is less than or equal to $0.55\ h_0$, a secondary lining is a component with large eccentricity, and the safety coefficient of each cross section is calculated according to the formula below (FIG. 3):

$$K_1 \leq \frac{R_w bx + R_g(A'_g - A_g)}{N}$$

$$K_2 \leq \frac{R_w bx(h_0 - x/2) + R_g A'_g(h_0 - a')}{Ne}$$

$$K = \min(K_1, K_2);$$

at the moment, a position of a neutral axis is determined according to the formula below:

$$R_g(A_g e \mp A'_g e') = R_w bx(e - h_0 + x/2);$$

when the axial force N acts between a gravity center of a rebar Ag and a gravity center of a rebar A'g, a second term on a left side of the above formula takes a positive sign; and when the axial force N acts outside rather than between the gravity center of the rebar Ag and the gravity center of the rebar A'g, the second term takes a negative sign;

when a stressed rebar is considered during calculation, a depth of compression zone of concrete should meet the requirement that x is greater than or equal to 2a', and if the requirement is not met, calculation is performed according to the formula below:

$$K \leq \frac{R_g A_g(h_0 - a')}{Ne'};$$

when the depth x of compression zone of the cross sections of the tunnel is greater to $0.55h_0$, a secondary lining is a component with small eccentricity, and the safety coefficient of each cross section is calculated according to the formula below (FIG. 4):

$$K \leq \frac{0.5 R_w b h_0^2 + R_g A'_g(h_0 - a')}{Ne};$$

and when the axial force N acts between the gravity center of the rebar Ag and the gravity center of the rebar A'g, the following requirements should be met:

$$K \leq \frac{0.5 R_w b h_0^2 + R_g A'_g(h'_0 - a)}{Ne'};$$

(5) contrastive analysis is performed on the cross sections under different flatness ratios: contrastive analysis of safety and economic efficiency is respectively performed on cross section forms under different flatness ratios;

firstly, the analysis on safety is performed: internal force and safety coefficients of the lining structures at the most disadvantageous positions under different flatness ratios are counted, minimum safety coefficients under different flatness ratios are counted, a curve that illustrates a relationship between the flatness ratio and the minimum safety coefficient that fluctuates along with the increase of flatness ratios of the cross sections is drawn, for a cross section with an inverted arch, a flatness ratio interval with the minimum safety coefficient greater than 4.50 is taken as a safety analysis optimal interval, and for a cross section without an inverted arch, a flatness ratio interval with the minimum safety coefficient greater than 3.20 is taken as a safety analysis optimal interval; and then, the analysis on economic efficiency is performed: economic efficiency indexes such as cross section perimeters, cross section areas and cross section utilization ratios under different flatness ratios are counted, cross section utilization ratios under different flatness ratios are calculated, Cross section utilization ratio=Construction limit area/Clearance area a curve that illustrates a relationship between the flatness ratio and the cross section utilization ratio that fluctuates along with the increase of flatness ratios of the cross sections is drawn, for a cross section with an inverted arch, a flatness ratio interval with a cross section utilization ratio greater than 50% is taken as an optimal economic efficiency interval, and for a cross section without an inverted arch, a flatness ratio interval with a cross section utilization ratio greater than 60% is taken as an optimal economic efficiency interval; and (6) reasonable cross section forms are obtained:
analysis results of safety and economic efficiency of the lining structures of the tunnel are summarized, and an overlapping range of a safety analysis optimal flatness ratio interval and an economic efficiency analysis optimal flatness ratio interval is taken as a flatness ratio optimal interval, wherein an optimal flatness ratio value is in an optimal cross section form of the single-hole four-lane highway tunnel.

The following provides the specific embodiments for verification.

Embodiment 1

According to the *Specifications for Design of Highway Tunnels (JTG 3370.1—2018)*, surrounding rock pressure of a single-hole four-lane highway tunnel is calculated based on V-class surrounding rock after conservative consideration, wherein the vertical uniform pressure is determined according to a formula of calculating vertical uniform pressure of a loose load of a deep tunnel, i.e., $q=0.45 \times 2^{s-1} \omega \gamma$.

A surrounding rock class is a V class, that is, S takes 5; a surrounding rock weight $\gamma$ takes 17 kN/m³; considering a construction process, excavation is performed based on headings, a coefficient i of increase and decrease of the surrounding rock pressure takes 0.07, an excavation span B takes 22 m, a width influence coefficient $\omega$ of 2.19 is obtained based on $\omega=1+i(B-5)$, the surrounding rock pressure is calculated to be 268 kN/m², and meanwhile considering an undertake ratio 65% of a load borne by a secondary lining, finally the vertical uniform pressure q applied to a model takes 170 kN/m².

The horizontal uniform pressure e is obtained after the obtained vertical uniform pressure is multiplied by a lateral pressure coefficient $\lambda$ given in the *Specifications for Design of Highway Tunnels*. By selecting different lateral pressure coefficients, different load conditions may be set. Therefore, 3 load working conditions are determined, as shown in Table 1.

TABLE 1

Load working condition parameters

| Load working | Lateral pressure | Vertical uniform pressure q (kN/m²) | Horizontal uniform pressure e (kN/m²) |
|---|---|---|---|
| 1 | 0.3 | 170 | 51 |
| 2 | 0.4 | 170 | 68 |
| 3 | 0.5 | 170 | 85 |

Linings select C30 reinforced concrete. Physical and mechanical parameters of rebars and concrete materials are shown in Table 2. According to the *Unified Theory of Concrete Filled Steel Tube*, strength of rebars and strength of concrete are made equivalent, and after the strengths reach equivalent, physical and mechanical parameters of lining materials serve as modeling parameters of lining structures of a tunnel, as shown in Table 3.

TABLE 2

Physical and mechanical parameters of lining materials of tunnel

| Supporting materials | Specification | Thickness/distance (cm) | Poisson's ratio μ | Volume-weight γ (kN/m³) | Elasticity modulus E (GPa) |
|---|---|---|---|---|---|
| Concrete | C30 | 70 | 0.2 | 23 | 31 |
| HRB400 rebar | φ25 | Dual-layer/20 | 0.2 | 77 | 210 |

TABLE 3

Physical and mechanical parameters of equivalent lining materials of tunnel

| Equivalent supporting | Poisson's ratio μ | Volume-weight γ (kN/m³) | Equivalent elasticity modulus E (GPa) |
|---|---|---|---|
| Lining | 0.2 | 25 | 33 |

Figure 5:
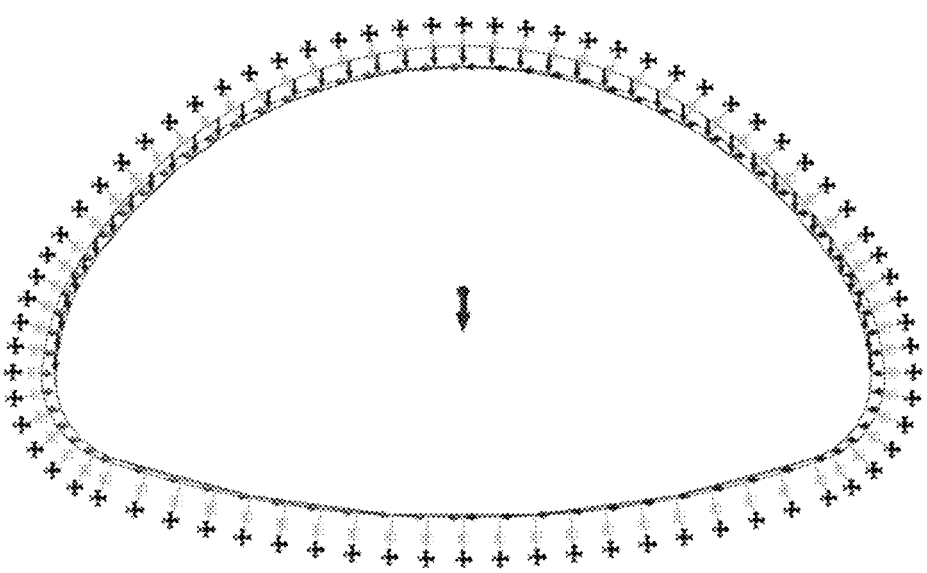
FIG. 5 is a diagram illustrating a numerical model of a tunnel (flatness ratio: 0.580)
Figure 6:
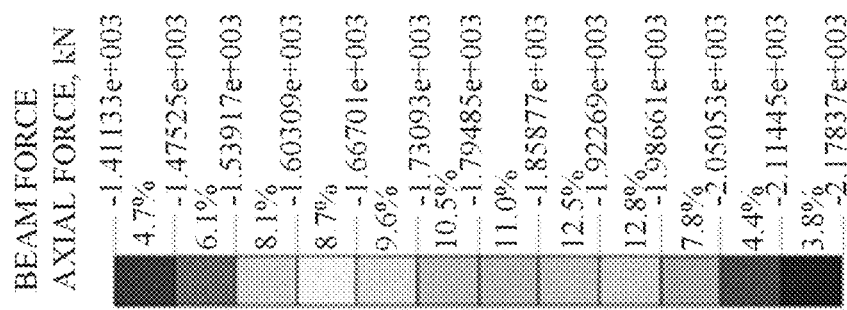
FIG. 6 is a diagram illustrating distribution of axial force of a lining under a load working condition 1 (flatness ratio: 0.580)
Figure 6:
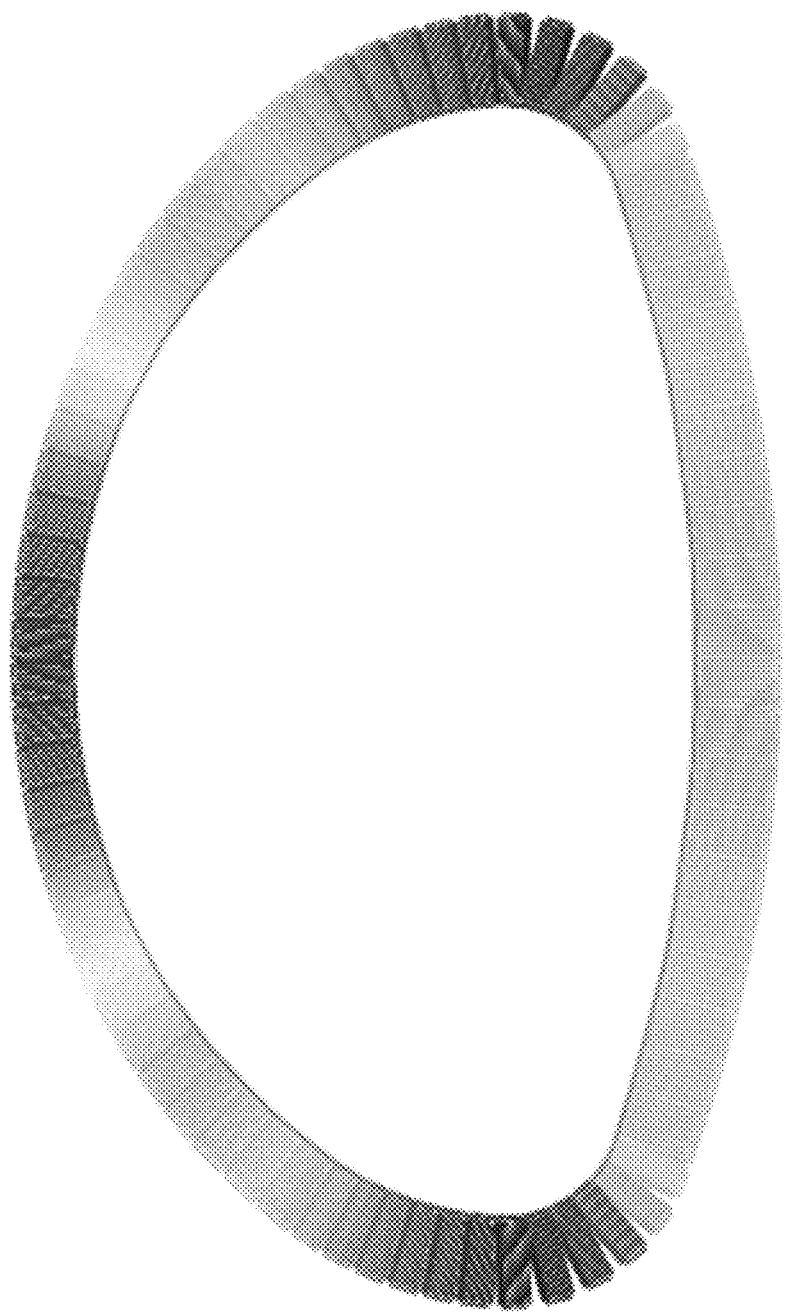
Figure 7:
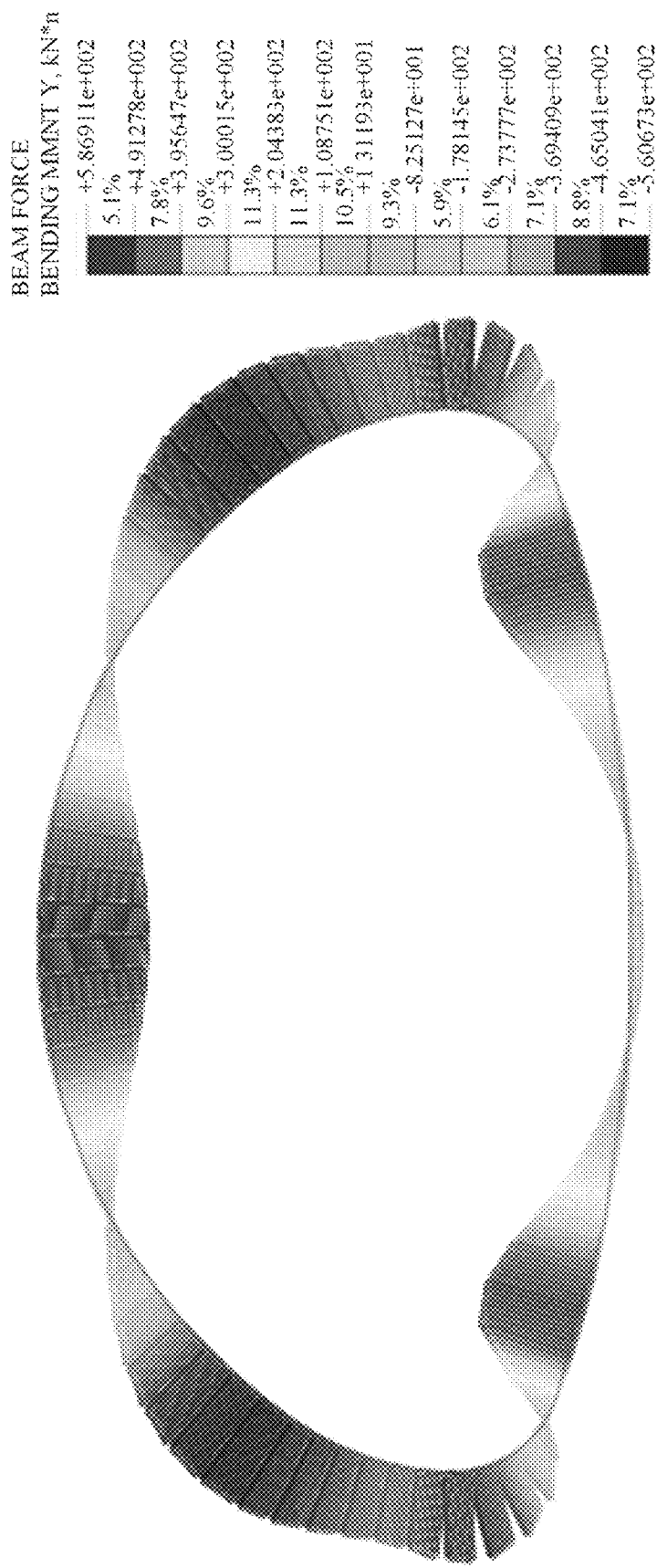
FIG. 7 is a diagram illustrating distribution of a bending moment of a lining under a load working condition 1 (flatness ratio: 0.580)
Figure 8:
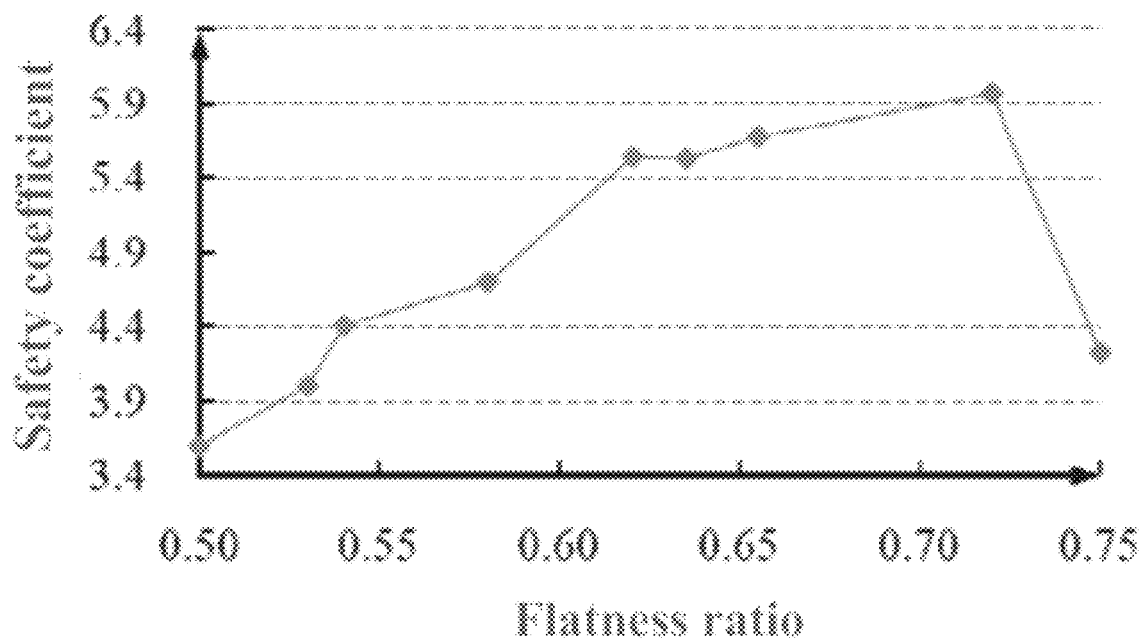
FIG. 8 is a curve illustrating a relationship between a flatness ratio and a minimum safety coefficient under a load working condition 1.
Figure 9:
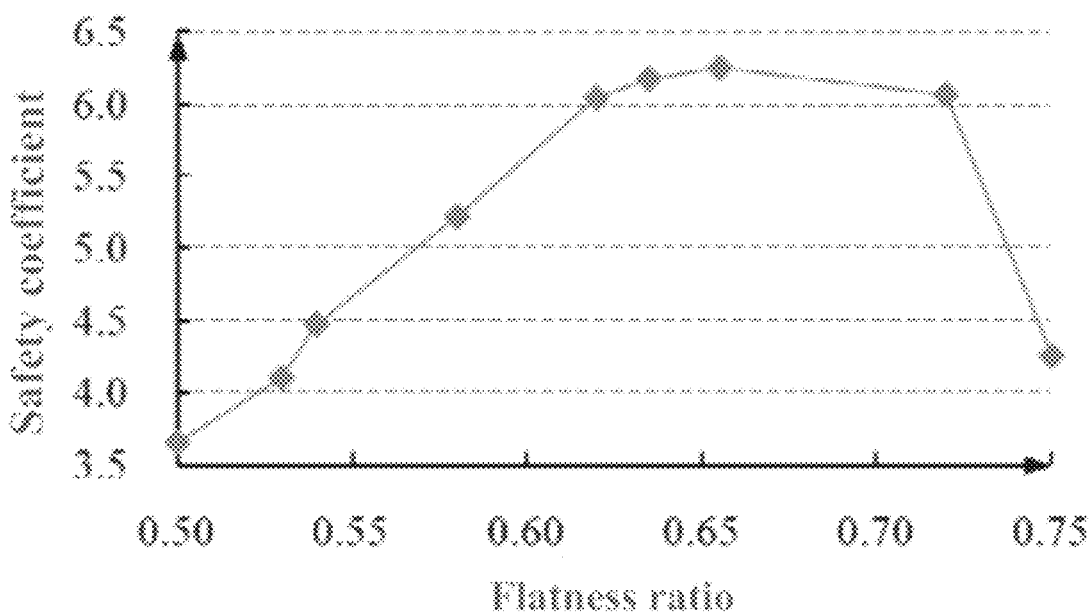
FIG. 9 is a curve illustrating a relationship between a flatness ratio and a minimum safety coefficient under a load working condition 2.
Figure 10:
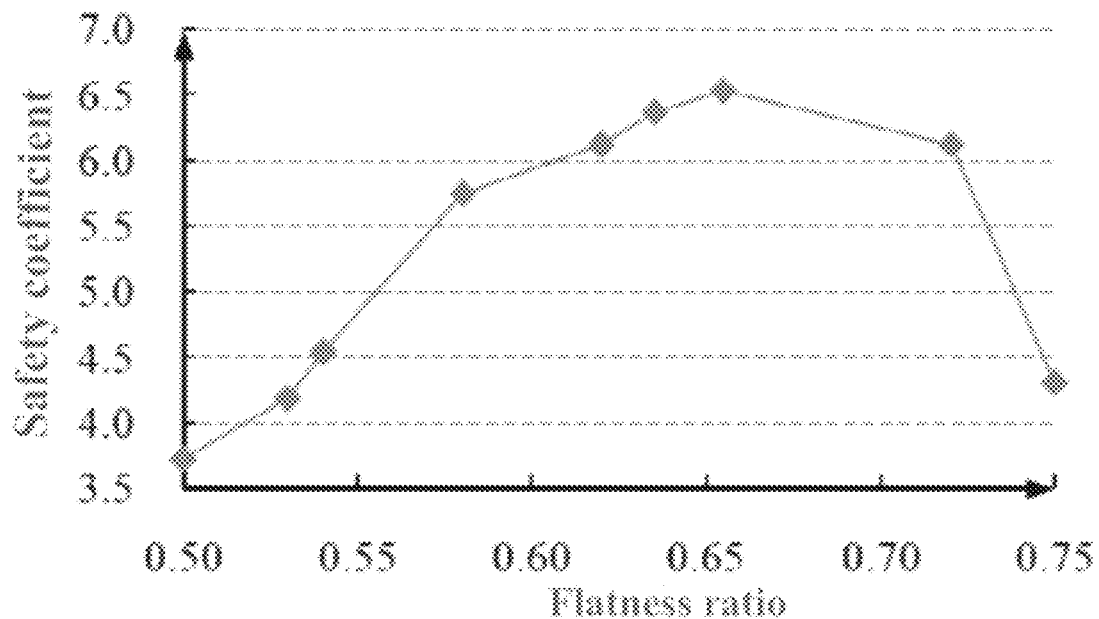
FIG. 10 is a curve illustrating a relationship between a flatness ratio and a minimum safety coefficient under a load working condition 3.

From research information, it can be learned that, provided that flatness ratios of tunnel cross sections with an inverted arc are distributed in a range of 0.5 to 0.75, flatness ratios respectively select 0.500, 0.530, 0.540, 0.580, 0.620, 0.635, 0.655, 0.720 and 0.750, so as to meet a same construction limit, and tunnel numerical calculation models are respectively constructed by using MIDAS/GTS finite element software. Herein, only a tunnel numerical model that has a flatness ratio of 0.580 under a load working condition 1 is provided, as shown in FIG. 5. Stress and safety coefficients of the lining structures are calculated, and calculation results of stress of the lining structures are shown in FIG. 6 and FIG. 7. Internal force and safety coefficients of the lining structures at the most disadvantageous positions under different flatness ratios are counted, as shown in Table 4. The curves illustrating a relationship between the flatness ratio and the minimum safety coefficient under various load working conditions are shown in FIG. 8 to FIG. 10.

TABLE 4

Statistics of internal force and safety coefficients of secondary lining

| Flatness ratio | Load working | Axial force value/kN | Bending moment | Most disadvantageous | Minimum safety |
|---|---|---|---|---|---|
| 0.500 | 1 | 2169 | 803 | Left and right arch feet | 3.6 |
| | 2 | 2180 | 789 | Left and right arch feet | 3.7 |
| | 3 | 2162 | 774 | Left and right arch feet | 3.7 |
| 0.530 | 1 | 2185 | 731 | Left and right arch feet | 4.0 |
| | 2 | 2198 | 715 | Left and right arch feet | 4.1 |
| | 3 | 2181 | 701 | Left and right arch feet | 4.2 |
| 0.540 | 1 | 1555 | 633 | Arch crown | 4.4 |
| | 2 | 2220 | 658 | Left and right arch feet | 4.5 |
| | 3 | 2196 | 648 | Left and right arch feet | 4.5 |
| 0.580 | 1 | 1412 | 587 | Arch crown | 4.7 |
| | 2 | 1463 | 547 | Arch crown | 5.2 |
| | 3 | 1514 | 508 | Arch crown | 5.8 |
| 0.620 | 1 | 1390 | 519 | Arch crown | 5.5 |
| | 2 | 2248 | 520 | Left and right wall feet | 6.0 |
| | 3 | 2216 | 514 | Left and right wall feet | 6.1 |
| 0.635 | 1 | 1364 | 515 | Arch crown | 5.5 |
| | 2 | 1417 | 473 | Arch crown | 6.2 |
| | 3 | 2207 | 469 | Left and right wall feet | 6.4 |
| 0.655 | 1 | 1425 | 509 | Arch crown | 5.7 |
| | 2 | 1476 | 470 | Arch crown | 6.3 |
| | 3 | 2268 | 421 | Left and right wall feet | 6.5 |
| 0.720 | 1 | 1432 | 488 | Arch crown | 6.0 |
| | 2 | 2321 | 491 | Left and right wall feet | 6.1 |
| | 3 | 2294 | 486 | Left and right wall feet | 6.1 |
| 0.750 | 1 | 2201 | 696 | Left and right wall feet | 4.2 |
| | 2 | 2176 | 689 | Left and right wall feet | 4.3 |
| | 3 | 2151 | 682 | Left and right wall feet | 4.3 |

From FIG. 8 to FIG. 10 and Table 4, it can be seen that, a whole cross section of a lining of a tunnel is in a stressed state, and internal force at a joint of an arch wall is relatively large. Minimum values of safety coefficients of the cross sections are all greater than a specified value 2.0 in the *Specifications for Design of Highway Tunnels* (*JTG* 3370.1—2018), and this indicates that lining structures are in a safety state.

From FIG. 8 to FIG. 10, it can be seen that, minimum safety coefficients of the structures fluctuate along with the increase of flatness ratios of the tunnel under same load conditions, wherein when the flatness ratios are less than 0.580, safety coefficients rapidly decrease, and safety of the structures obviously drops; when the flatness ratios are in a range of 0.580 to 0.720, the minimum safety coefficients are all greater than 4.50, this is a safety analysis optimal interval, and especially when the flatness ratios are 0.655, safety coefficients reach the maximum.

Figure 11:
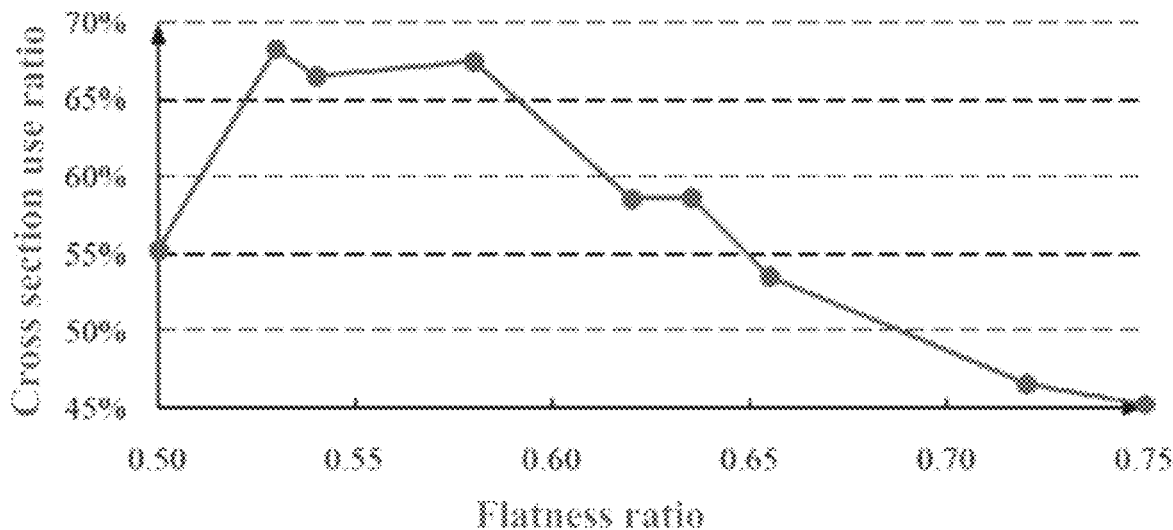
FIG. 11 is a curve illustrating a relationship between a flatness ratio and a cross section utilization ratio.

Economic efficiency indexes such as cross section perimeters, cross section areas and cross section utilization ratios under different flatness ratios are counted and analyzed, as shown in Table 5. A curve illustrating a relationship between the flatness ratio and the cross section utilization ratio is shown in FIG. 11.

TABLE 5

Contrastive analysis of economic efficiency of cross sections under different flatness ratios

| Flatness ratio | Clearance perimeter/m | Clearance area/$m^2$ | Cross section utilization ratio |
|---|---|---|---|
| 0.500 | 50.88 | 159.51 | 55.3% |
| 0.530 | 44.53 | 129.07 | 68.3% |
| 0.540 | 45.09 | 132.58 | 66.5% |
| 0.580 | 43.92 | 130.65 | 67.5% |
| 0.620 | 46.82 | 150.57 | 58.6% |
| 0.635 | 46.46 | 150.35 | 58.7% |
| 0.655 | 48.17 | 164.66 | 53.6% |
| 0.720 | 50.70 | 189.14 | 46.6% |

From Table 5 and FIG. 11, it can be seen that, cross section utilization ratios fluctuate along with the increase of flatness ratios of cross sections. The flatness ratios increase to 0.530 from 0.500, and thus the cross section utilization ratios increase along with the increase of the flatness ratios. When the flatness ratios are 0.530, the cross section utilization ratios reach the maximum, i.e., 68.3%. When the flatness ratios exceed 0.655, the cross section utilization ratios are relatively low, lower than 53.6%. When the flatness ratios are in a range of 0.500 to 0.655, a condition that the cross section utilization ratios are greater than 50% is met, and this is an optimal economic efficiency interval.

Through analysis of stress and safety of the lining structures of the tunnel, it can be learned that, when flatness ratios are in a range of 0.580 to 0.720, minimum safety coefficients are all greater than 4.50, and this belongs to a safety analysis optimal interval. When the flatness ratios are 0.655, safety of the structures is the most ideal. Then, in combination with analysis of engineering economic efficiency, when the flatness ratios are in a range of 0.580 to 0.655, cross sections are relatively small in area and high in utilization ratio. The cross section utilization ratios are all greater than 50%, and this belongs to an economic efficiency analysis optimal interval. Therefore, on the premise of ensuring long-term stability and safety of the lining structures and considering engineering economic efficiency, an overlapping range of the safety analysis optimal interval and the economic efficiency analysis optimal interval is taken. To sum up, when flatness ratios are in a range of 0.580 to 0.655, stress safety of the lining structures is high, cross section utilization ratios are also relatively high, and engineering economic efficiency is remarkable. Therefore, this range is a range of reasonable values for flatness ratios of cross sections with an inverted arch of the single-hole four-lane highway tunnel.

In a similar way, it can be figured out that, when flatness ratios of cross sections without an inverted arch of the single-hole four-lane highway tunnel are in a range of 0.400 to 0.480, minimum safety coefficients of the structures are all greater than 3.20, and this is a safety analysis optimal interval. When flatness ratios are in a range of 0.450 to 0.500, cross section utilization ratios are all greater than 60%, and this is an economic efficiency analysis optimal interval. The overlapping range of the safety analysis optimal interval and the economic efficiency analysis optimal interval is taken, and a range of reasonable values for flatness ratios of cross sections without an inverted arch of the single-hole four-lane highway tunnel is 0.450 to 0.480.

Figure 12:
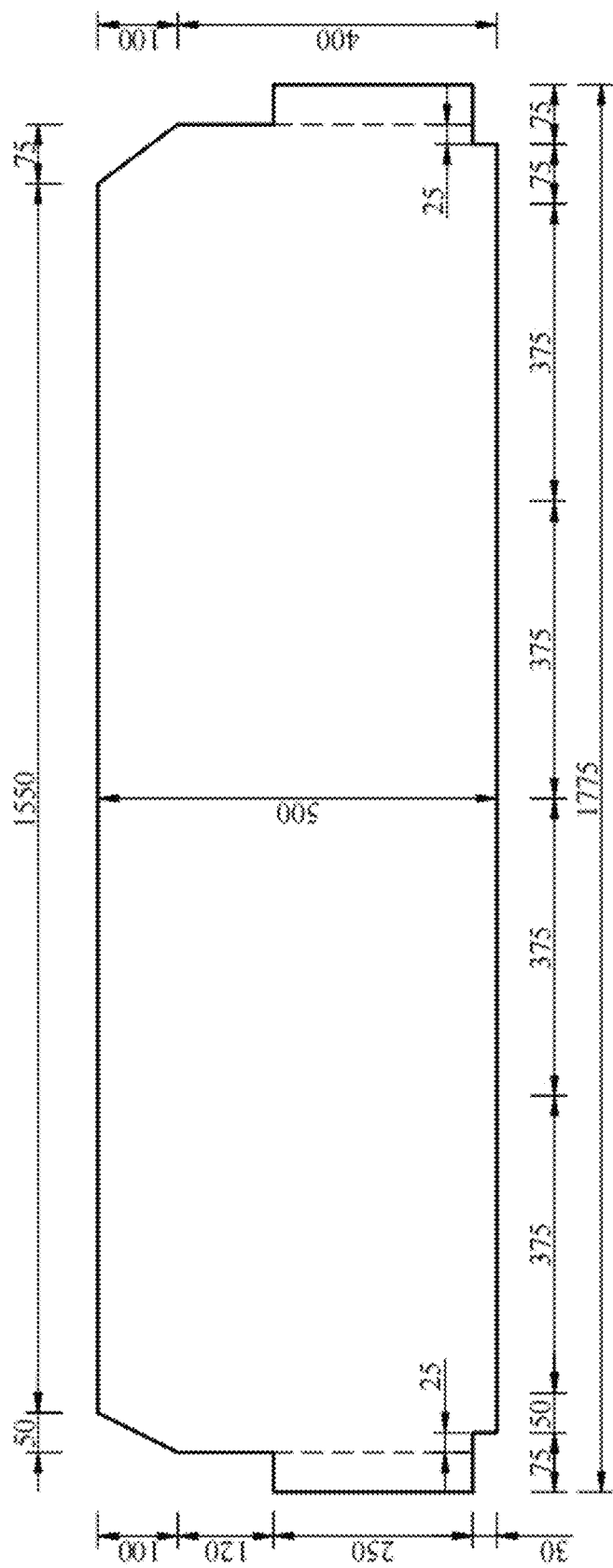
FIG. 12 is a diagram illustrating a construction limit of a single-hole four-lane highway tunnel (100 km/h) (size unit: cm)
Figure 13:
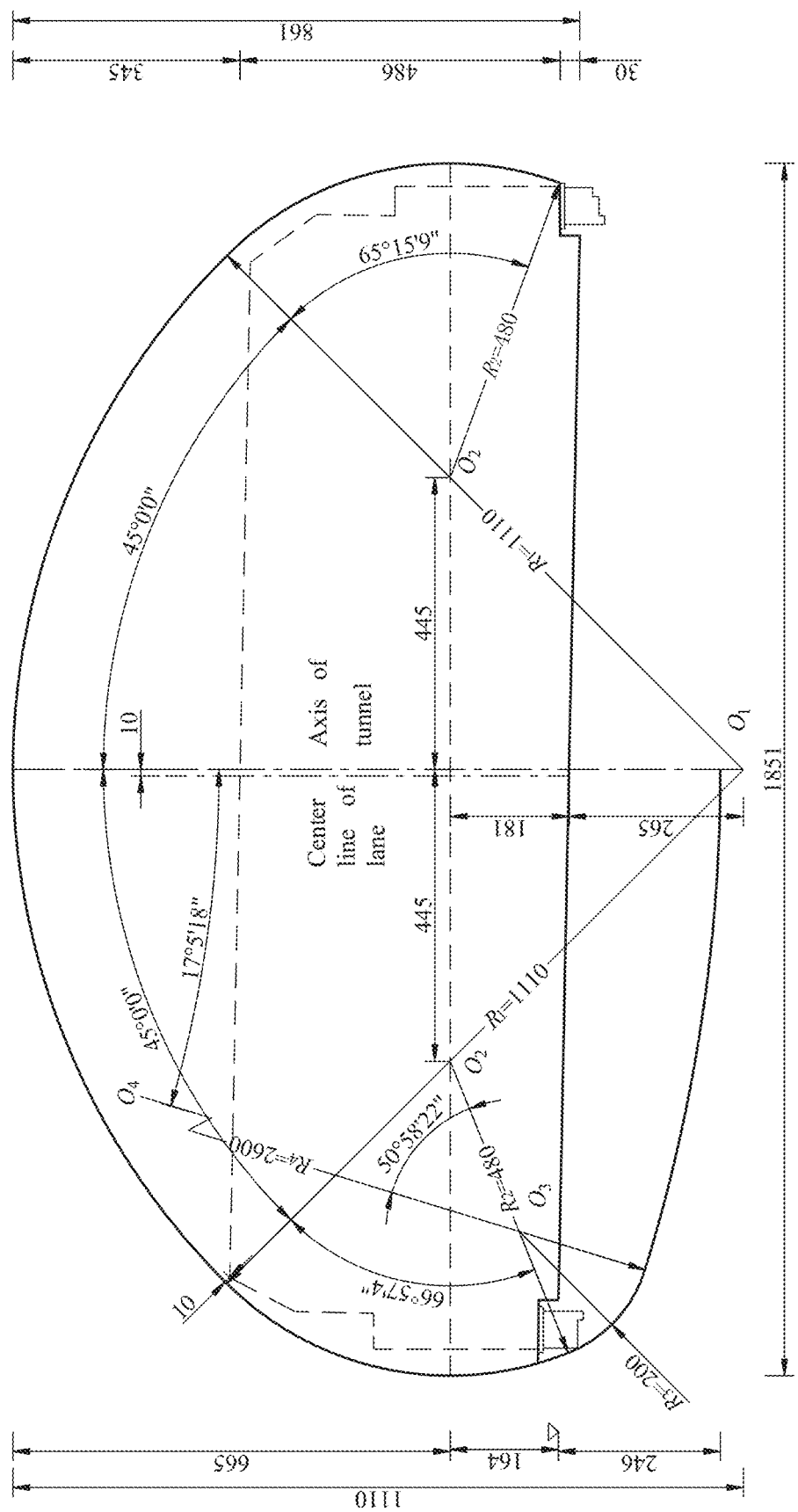
FIG. 13 is a diagram illustrating an inner contour of a single-hole four-lane highway tunnel (100 km/h) (size unit: cm).

Based on a requirement for a tunnel construction limit under different vehicle speeds in the *Specifications for Design of Highway Tunnels* (*JTG* 3370.1—2018), in combination with a study of reasonable flatness ratios of cross sections of the single-hole four-lane highway tunnel, a diagram of a suggested inner contour of the single-hole four-lane highway tunnel under different vehicle speeds may be designed. A construction limit (80 km/h) of the single-hole four-lane highway tunnel is shown in FIG. 12. All parameters of the construction limit meet regulations of the *Specifications for Design of Highway Tunnels*, and step height takes 30 cm. Based on the construction limit in FIG. 12, a diagram (80 km/h) of an inner contour of the single-hole four-lane highway tunnel is shown in FIG. 13, wherein a flatness ratio of a cross section without an inverted arch is 0.465, and a flatness ratio of a cross section with an inverted arch is 0.581.

What is claimed is:

1. A design method for parameters of cross sections of a single-hole four- lane highway tunnel, wherein comprising the following steps:
   (1) determining surrounding rock pressure:
   calculating, based on grade parameters of surrounding rock, surrounding rock pressure of the single-hole four-lane highway tunnel, wherein the surrounding rock pressure of the single-hole four-lane highway tunnel comprises vertical uniform pressure q and horizontal uniform pressure e;
   (2) constructing numerical models under different flatness ratios:
   selecting, based on a construction limit of the tunnel, a series of cross section flatness ratio parameters, and respectively constructing tunnel numerical calculation models by using MIDAS/GTS finite element software, wherein when the tunnel has a cross section with an inverted arch, flatness ratios select multiple groups of different numerical values from 0.500 to 0.750, and when the tunnel has a cross section without an inverted arch, flatness ratios select multiple groups of different numerical values from 0.400-0.560;
   (3) calculating internal force of lining structures:
   calculating stress on the lining structures of the cross sections of the tunnel under different flatness ratios by using the MIDAS/GTS finite element software, to obtain axial force N and bending moments M of the lining structures;
   (4) calculating safety coefficients of the lining structures:
   calculating, based on calculation results of the axial force N and the bending moments M of linings at different positions of the cross sections, and physical and mechanical parameters of lining materials, the safety coefficients K of the lining structures at different positions of the cross sections;
   (5) performing contrastive analysis on the cross sections under different flatness ratios:
   respectively performing contrastive analysis of safety and economic efficiency on cross section forms under different flatness ratios; and
   (6) obtaining reasonable cross section forms:
   summarizing analysis results of safety and economic efficiency of the lining structures of the tunnel, taking a flatness ratio overlapping range of an optimal safety interval and an optimal economic efficiency interval as a flatness ratio optimal interval, and selecting flatness ratio parameters in the flatness ratio optimal interval to perform design of the cross sections of the single-hole four-lane highway tunnel;

wherein the embodiment of step [4] is as follows:

for a pre-designed lining reinforced concrete component, a depth x of compression zone of each cross section may be calculated first according to the formula below, in a direction perpendicular to the cross sections, and based on a tension and compression balance:

$R_g(A_g - A'_g) = R_w bx;$ when the depth x of compression zone of the cross sections of the tunnel is less than or equal to $0.55h_{02}$, a secondary lining is a component with large eccentricity, and the safety coefficient of each cross section is calculated according to the formula below:

$$K_1 \leq \frac{R_w bx + R_g(A'_g - A_g)}{N}, \text{ and}$$

$$K_2 \leq \frac{R_w bx(h_0 - x/2) + R_g A'_g(h_0 - a')}{Ne}$$

$$K = \min(K_1, K_2);$$

at the moment, a position of a neutral axis is determined according to the formula below:

$R_g(A_g e \mp A'_g e') = R_w bx(e - h_0 + x/2);$ when the axial force N acts between a gravity center of a rebar $A_g$ and a gravity center of a rebar $A'_g$, a second term on a left side of the above formula takes a positive sign; and when the axial force N acts outside rather than between the gravity center of the rebar $A_g$ and the gravity center of the rebar $A'_g$, the second term takes a negative sign;

when a stressed rebar is considered during calculation, a depth of compression zone of concrete should meet the requirement that x is greater than or equal to 2a', and if the requirement is not met, calculation is performed according to the formula below:

$$K \leq \frac{R_g A_g(h_0 - a')}{Ne'};$$

when the depth x of compression zone of the cross sections of the tunnel is greater than $0.55h_0$, a secondary lining is a component with small eccentricity, and the safety coefficient of each cross section is calculated according to the formula below:

$$K \leq \frac{0.5 R_w bh_0^2 + R_g A'_g(h_0 - a')}{Ne};$$

and when the axial force N acts between the gravity center of the rebar $A_g$ and the gravity center of the rebar $A'_g$, the following requirements should be met:

$$K \leq \frac{0.5 R_w bh_0^2 + R_g A'_g(h'_0 - a)}{Ne'}$$

in the formula: N represents axial force (MN); M represents a bending moment (MN·m); $R_g$ represents a standard value of tensile strength or compressive strength of a rebar; $R_w$ represents limit bending compressive strength of concrete, and $R_w=1.25 R_a$; $A_g$ and $A'_g$ represent cross section areas (m²) of a rebar in a tensile zone and a compressive zone; a' represents a distance (m) from the gravity center of the rebar $A'_g$ to a nearest edge of a cross section; a represents a distance (m) from the gravity center of the rebar $A_g$ to the nearest edge of the cross section; h represents a height of a cross section; $h_0$ represents an effective height (m) of a cross section, and $h_0=h-a$; x represents a depth (m) of compression zone of concrete; b represents a width (m) of a rectangular cross section; e and e' represent distances from the gravity centers of the rebars $A_g$ and $A'_g$ to an acting point of the axial force; and K represents a safety coefficient.

2. The design method for parameters of cross sections of a single-hole four-lane highway tunnel according to claim 1, wherein in step (5), performing analysis on safety is analyzing internal force of the lining structures at the most disadvantageous positions under different flatness ratios, counting minimum safety coefficients under different flatness ratios, for a cross section with an inverted arch, taking a flatness ratio interval with the minimum safety coefficient greater than 4.50 as an optimal safety interval, and for a cross section without an inverted arch, taking a flatness ratio interval with the minimum safety coefficient greater than 3.20 as an optimal safety interval.

3. The design method for parameters of cross sections of a single-hole four-lane highway tunnel according to claim 1, wherein in step (5), performing analysis on economic efficiency is drawing a curve that illustrates a relationship between a flatness ratio and a cross section utilization ratio, for a cross section with an inverted arch, taking a flatness ratio interval with a cross section utilization ratio greater than 50% as an optimal economic efficiency interval, and for a cross section without an inverted arch, taking a flatness ratio interval with a cross section utilization ratio greater than 60% as an optimal economic efficiency interval.

* * * * *